(12) United States Patent
Kang

(10) Patent No.: US 8,836,774 B2
(45) Date of Patent: *Sep. 16, 2014

(54) OPERATION METHOD OF SHUTTER GLASSES BASED 3D DISPLAY DEVICE

(75) Inventor: Chihtsung Kang, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 299 days.

This patent is subject to a terminal disclaimer.

(21) Appl. No.: 13/381,937

(22) PCT Filed: Nov. 26, 2011

(86) PCT No.: PCT/CN2011/083002
§ 371 (c)(1),
(2), (4) Date: Dec. 31, 2011

(87) PCT Pub. No.: WO2013/071641
PCT Pub. Date: May 23, 2013

(65) Prior Publication Data
US 2013/0120545 A1    May 16, 2013

(51) Int. Cl.
*H04N 13/04* (2006.01)
*H04N 9/47* (2006.01)

(52) U.S. Cl.
CPC ....... *H04N 13/0438* (2013.01); *H04N 13/0497* (2013.01)
USPC ............................................. 348/56; 348/53

(58) Field of Classification Search
None
See application file for complete search history.

(56) References Cited

U.S. PATENT DOCUMENTS

2011/0050870 A1* 3/2011 Hanari ............................ 348/56

* cited by examiner

*Primary Examiner* — Heather Jones
(74) *Attorney, Agent, or Firm* — Cheng-Ju Chiang

(57) ABSTRACT

The present invention relates to an operation method of shutter glasses based 3D display device, which alternatively supplies left-eye and right-eye frame signals to a liquid crystal panel to drive the liquid crystal panel, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal, and the duty time of each of the blocks is divided into duty1, a duty time that precedes completion of response of liquid crystal, and duty2, a duty time that succeeds the completion of response of liquid crystal, luminance of each of the block in duty1 period and duty2 period being respectively adjusted so that each of the blocks has a luminance of liquid crystal corresponding thereof that is equal to a target luminance for both duty1 period and duty2 period. The operation method of shutter glasses based 3D display device according to the present invention alleviates after image caused by crosstalk between left and right eyes without shortening the duty time of each block of BLU.

4 Claims, 3 Drawing Sheets

OPERATION METHOD OF SHUTTER GLASSES BASED 3D DISPLAY DEVICE

BACKGROUND OF THE INVENTION

1. Field of the Invention

The present invention relates to the technical field of 3D (3-Dimensional) displaying, and in particular to an operation method of shutter glasses based 3D display devices.

2. The Related Arts

The conventional glasses based 3D displaying techniques generally supply signals of left-eye and right-eye frames to a liquid crystal panel in an alternate manner to respectively drive the liquid crystal panel to form thereon left-eye and right-eye images, which cooperate with illumination of a scanning back light unit (BLU) and timing control of shutter glasses to stimulate left and right eyes with left-eye and right-eye signals respectively to thereby making a user perceive a 3D image. Since the response speed of a liquid crystal screen is excessively slow, the timing of activation of the BLU and opening of the shutter glasses and the duty time thereof must be adjusted to reduce the influence of crosstalk between left and right eyes. However, such control of timing reduces the activation time of the backlight and the shutter glasses, resulting in reduction of luminance or flickering.

As shown in FIG. 1, a timing chart of a conventional shutter glasses based 3D display device is shown. The vertical axis indicates vertical positions on a panel of the display device and the horizontal axis indicates time. The BLU of a regular 3D display device is divided into vertical blocks and thus a scanning operation is performed to sequentially, in a top to down manner, control the activation and duty time of each block of the back light unit (an example of five blocks, S1, S2, S3, S4, S5, being given in FIG. 1). The time period for left-eye and right-eye signals of the display device are respectively T1 and T2, each representing the time period of a frame. A frame time is composed of the driving time of a signal (the signal being from the first line to the last line) and time of blanking. The signal sequentially provides a necessary driving voltage to each line of the liquid crystal panel in a top to down manner. After a pixel receives the driving voltage and is charged, the liquid crystal starts to respond. Due to the arrangement of pixel and the viscosity of liquid crystal, there is a period of response time, L0, for the liquid crystal to completely reach a desired stable condition, namely the target luminance signal for each of the left and right eyes. Further, an additional important parameter of the shutter glasses based 3D display device is the opening and closing time of the left and right eyes of the shutter glasses. An overall adjustment must be made on the timing of the shutter glasses, in combination with the scanning time of each block of the back light unit, the response time of the liquid crystal, and the blanking time, to realize optimization of the 3D effect of the liquid crystal display, so that the left-eye and right-eye signals will not overlap and cause after image. Otherwise, as shown in FIG. 1, during the opening time period of the left eye of the shutter glasses, the signal to the liquid crystal associated with block S1 has already been switched from a left-eye signal to a right-eye signal, and this causes the right-eye signal to be seen during the opening time period of the left eye of the shutter glasses. Consequently, at the time when block S1 is in operation, the left eye of the shutter glasses will see the after image of the right-eye signal in a short period of time. Further, as shown in FIG. 1, the left eye of the shutter glasses has an early opening time and blocks S2, S3, S4, and S5, when in operation, supply left-eye signals. Meanwhile, due to the slow response of liquid crystal, blocks S2, S3, S4, and S5, when in operation, are subject to influence, to different extents, by the previous right-eye image, resulting in interference of after image.

Further, keyboards are used outdoors more and more frequently. However, for outdoor or public site use, due to more dust existing in the outside environments, such dusts may easily get into the keyboard through gaps present in a device surface and may get chronic accumulation, making it hard to be cleaned and eventually affecting the performance and lifespan of the keyboard.

SUMMARY OF THE INVENTION

Thus, an objective of the present invention is to provide an operation method of shutter glasses based 3D display device that alleviates the after image phenomenon of the shutter glasses based 3D display device.

To achieve the objective, the present invention provides an operation method of shutter glasses based 3D display device, which alternatively supplies left-eye and right-eye frame signals to a liquid crystal panel to drive the liquid crystal panel to respectively form left-eye and right-eye images, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal, and according to the time of complete response of the liquid crystal as being driven by the signal of the current frame, the duty time of each of the blocks is divided into duty1, a duty time that precedes completion of response of liquid crystal, and duty2, a duty time that succeeds the completion of response of liquid crystal, luminance of each of the block in duty1 period and duty2 period being respectively adjusted so that each of the blocks has a luminance of liquid crystal corresponding thereof that is equal to a target luminance for both duty1 period and duty2 period.

Wherein, for each pixel located in the liquid crystal corresponding to each of the blocks of the back light unit:

in the duty1 period, the maximum grey level signal of the liquid crystal corresponding to each block of the back light unit is corrected to Max, and $T'_{max,m}$ indicates the average transient transmittance of the liquid crystal corresponding to the mth block of the back light unit under signal grey level being Max, where Max indicates the maximum signal grey of the liquid crystal panel;

in the duty2 period, the transmittance of each pixel is individually changed to $T_{m,pixel} = T_{m,pixel,0} \times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to the mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame; and the mth block of the back light unit is adjusted to set the luminance thereof in the duty1 period to be $B'_{Max,m}$ and the luminance in the duty2 period be $B_{Max,m}$ according to the following formula: target luminance=$T'_{Max,m} \times B'_{Max,m} = T_{Max} \times B_{Max,m}$.

Wherein, each pixel located in the liquid crystal corresponding to each of the blocks of the back light unit:

in the duty1 period, the duty1 period is divided into n sub-periods duty11 to duty1n, and in each sub-period, the maximum signal grey level of the liquid crystal corresponding to each block of the back light unit is corrected to Max and $T'_{max,m,n}$ indicates the average transient transmittance of the liquid crystal corresponding to the mth block of the back light unit under signal grey level Max for the nth sub-period, where Max indicates the maximum signal grey of the liquid crystal panel and n is a natural number greater than 2;

in the duty2 period, the transmittance of each pixel is individually changed to $T_{m,pixel} = T_{m,pixel,0} \times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to the mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame; and the mth block of the back light unit is adjusted to set the luminance thereof in the nth sub-period of the duty1 period to be $B'_{Max,m,n}$ and the luminance in the duty2 period be $B_{Max,m}$ according to the following formula: target luminance= $T'_{Max,m,n} \times B'_{Max,m,n} = T_{Max} \times B_{Max,m}$.

Wherein, the target luminance=transmittance of the maximum steady grey level signal of the liquid crystal corresponding to each of the blocks×the duty time of backlight of the block×backlight luminance of compensated driving current of the block, wherein the target luminance of liquid crystal corresponding to each of the blocks is the maximum 2D luminance of the liquid crystal corresponding to the block or the maximum 3D luminance of the liquid crystal corresponding to the block.

Calculating average transient transmittance is performed as follows: a grey-to-grey response curve (switching from one grey level to another grey level) of liquid crystal being measured; based on number of time intervals to be divided, the response curve being equally divided into time intervals according the number of division; and transmittance of each identical interval of time being calculated from the response curve.

The operation method of shutter glasses based 3D display device according to the present invention alleviates after image caused by crosstalk between left and right eyes, without shortening the duty time of each block of BLU, and can make compensation for magnified signal of LED current of each time interval for each block by calculation of the transient transmittance of the compensation signal of each interval for each block to thereby reduce over-driving of backlight LED current, reduce the needed number of LEDs for backlighting, and also achieve the purposes of saving power.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
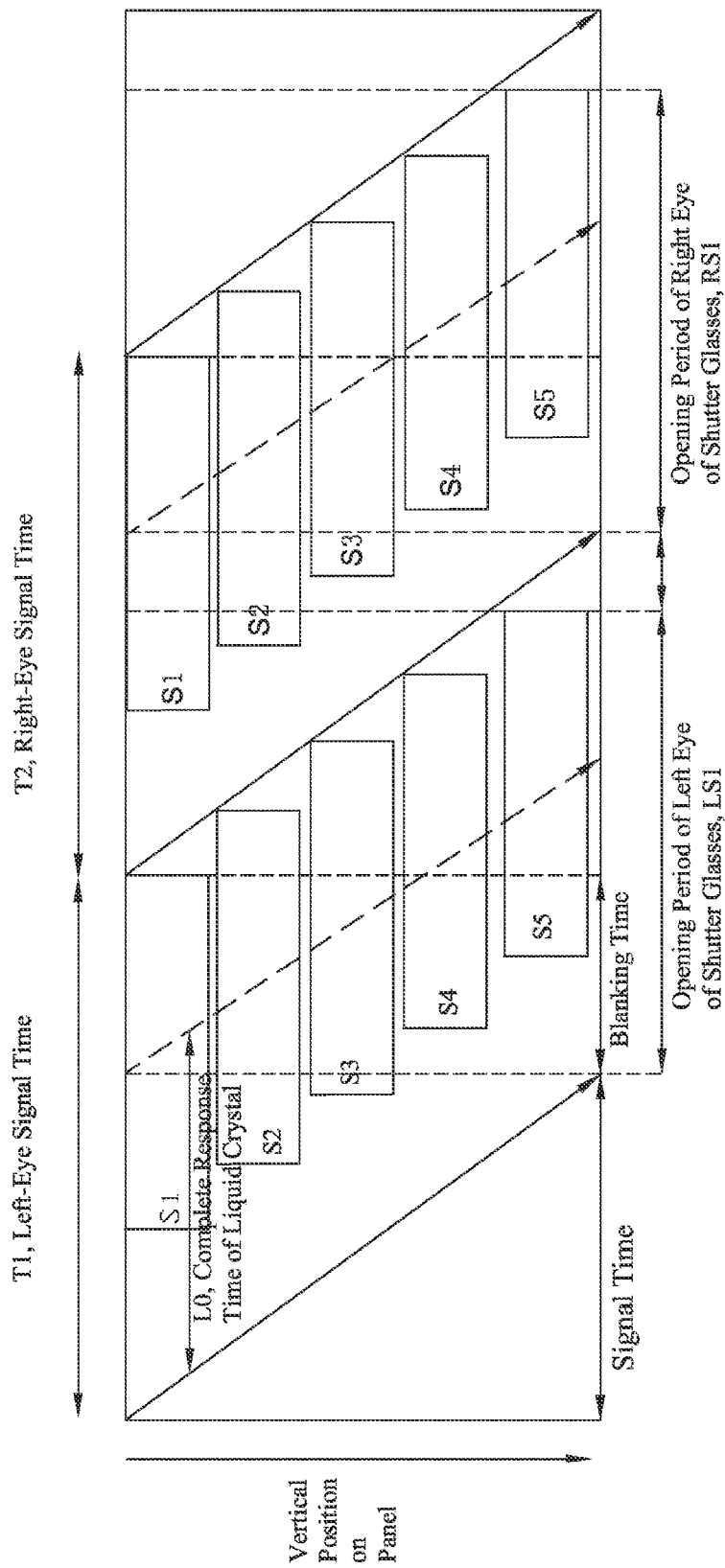
FIG. 1 is a timing chart of a conventional shutter glasses based 3D display device.
Figure 2:
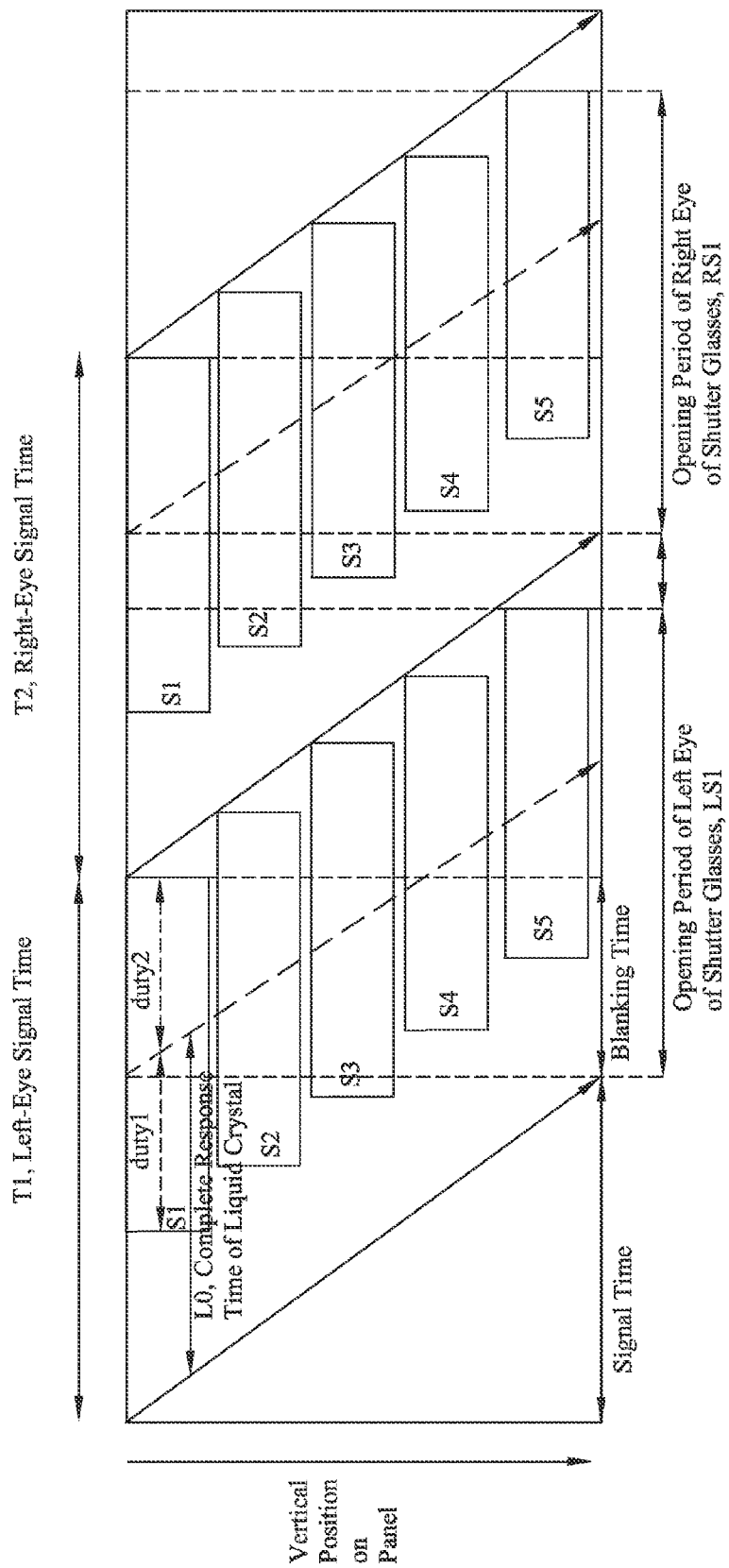
FIG. 2 is a timing chart of an operation method of shutter glasses based 3D display device according to the present invention according to a first preferred embodiment of the present invention.

Referring to FIG. 2, a timing chart of an operation method of shutter glasses based 3D display device according to a first preferred embodiment of the present invention is shown. The present invention allows the shutter glasses based 3D display device to show the minimum after image by controlling LED current power, duty time and signal of each block (S1, S2, S3, S4, S5), in combination with performance of compensation. The time that an LED of each of blocks of backlight is activated does not need to start after the response of liquid crystal. The duty time of each block of the back light unit can be extended as long as possible, but the duty time of each block is divided into duty1 that precedes the completion of response of liquid crystal and duty2 that succeeds the completion of response of liquid crystal. The difference of transmittance of liquid crystal preceding the response and succeeding the response must be remedied by control of backlight luminance, such as control the magnitude of electrical current of the backlighting LEDs, in order to maintain consistent overall luminance signal, so that each individual block shows a luminance of the corresponding liquid crystal that is equal to a target luminance for both duty1 period and duty2 period. The transmittance of liquid crystal in the duty1 period before complete response is referred to as transient transmittance, and the transmittance of liquid crystal in duty2 period after complete response is referred to as steady transmittance. The transient transmittance for duty1 period varies continuously with the response of the liquid crystal and a method for calculating average transient transmittance is as follows: The grey-to-grey response curve of the liquid crystal is measured and based on the number of time intervals to be divided, the response curve is equally divided into time intervals according the number of division. The transmittance of each identical interval of time is then calculated from the response curve.

Taking 8-bit liquid crystal as an example, target luminance=transmittance of the maximum steady grey level signal for each block×2D backlight luminance=average transient transmittance of each block with the liquid crystal corresponding thereto being magnified to 255 grey level signal in duty1 period×backlight luminance of each block in duty1 period=average steady transmittance of each block with the liquid crystal corresponding thereto being magnified to 255 grey level signal in duty2 period×backlight luminance of each block in duty2 period. The target luminance of liquid crystal corresponding to each block is the maximum 2D luminance of the liquid crystal corresponding to the block or the maximum 3D luminance of the liquid crystal corresponding to the block. Specifically, according to FIG. 2, the maximum 2D luminance of the liquid crystal corresponding to each block (S1, S2, S3, S4, S5) or the maximum 3D luminance of the liquid crystal corresponding to each block (S1, S2, S3, S4, S5)=the maximum transmittance (which is the transmittance for grey level 255 for an example of 8-bit liquid crystal)×the duty time of each backlight block×backlight luminance of the block under compensated driving current. By adjusting the LED current of each block, the luminance of the liquid crystal panel can be maintained at the 2D luminance level, satisfies the desired level of luminance for 3D.

An advantage of this operation is that it no longer needs to activate the LEDs of the back light unit after the complete response of the liquid crystal and the need for magnifying LED driving currents to maintain the desired 3D luminance due to the reduction of luminance caused by shortening the activation time of LED can be eliminated. In the duty1 period when the liquid crystal has not completely responded, a process of first magnifying signal to increase effective transmittance or lowering the signal to decrease the effective transmittance is applied to compensate the crosstalk phenomenon caused by excessive slowness of the response speed. In the duty2 period when complete response of liquid crystal has been reached, due to the fact that signal compensation has been previously applied to increase the average transmittance by magnifying the signal or to decrease the average transmittance by lowering the signal, the level of the signal must exceed the original requirement for image signal. At this moment, magnification or reduction of the LED driving current must be taken in order to maintain the overall luminance signal consistent.

For each pixel located in the liquid crystal corresponding to each of the blocks of the back light unit:

In the duty1 period, the maximum grey level signal of the liquid crystal corresponding to each block of the back light unit is corrected to Max, and $T'_{max,m}$ indicates the average transient transmittance of the liquid crystal corresponding to the mth block of the back light unit under signal grey level being Max, where Max indicates the maximum signal grey of the liquid crystal panel;

In the duty2 period, the transmittance of each pixel is individually changed to $T_{m,pixel}=T_{m,pixel,0}\times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to the mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame;

The mth block of the back light unit is adjusted to set the luminance thereof in the duty1 period to be $B'_{Max,m}$ and the luminance in the duty2 period be $B_{Max,m}$ according to the following formula: target luminance=$T'_{Max,m}\times B'_{Max,m}=T_{Max}\times B_{Max,m}$.

Taking block S1 shown in FIG. 2 as an example for illustration, the original maximum signal grey level of the liquid crystal corresponding to block S1 of left eye or right eye is N, the liquid crystal transmittance is $T_N$, and the liquid crystal luminance is $L_N$. By controlling backlight luminance BN with the current of BLU, according to the formula: $L_N=T_N\times B_N$, for 8-bit liquid crystal, in duty1 period, the maximum signal is corrected to 255 grey level and under this condition, the transient transmittance of the 255 grey level liquid crystal is $T'_{255}$. At this moment, the backlight luminance $B'_{255}$ is adjusted by adjusting the current of BLU to have the overall liquid crystal luminance satisfies $L_N=T_N\times B_N=L_N=T'_{255}\times B'_{255}$. Then, in the following duty2 period, the steady transmittance of the 255 grey level liquid crystal is indicated by $T_{255}$, and the BLU current is adjusted to adjust the backlight luminance $B_{255}$, so that $L_N=T_N\times B_N=L_N=T'_{255}\times B'_{255}=T_{255}\times B_{255}$, and if $T'_{255}<T_{255}$, $B'_{255}>B_{255}$.

Under this condition, for the liquid crystal corresponding to block S1, except the pixel having the maximum signal grey level N being magnified to 255 grey level, the transmittance of the remaining pixels in this block is magnified to a desired signal by the magnification ratio of $T_{255}/T_N$.

Figure 3:
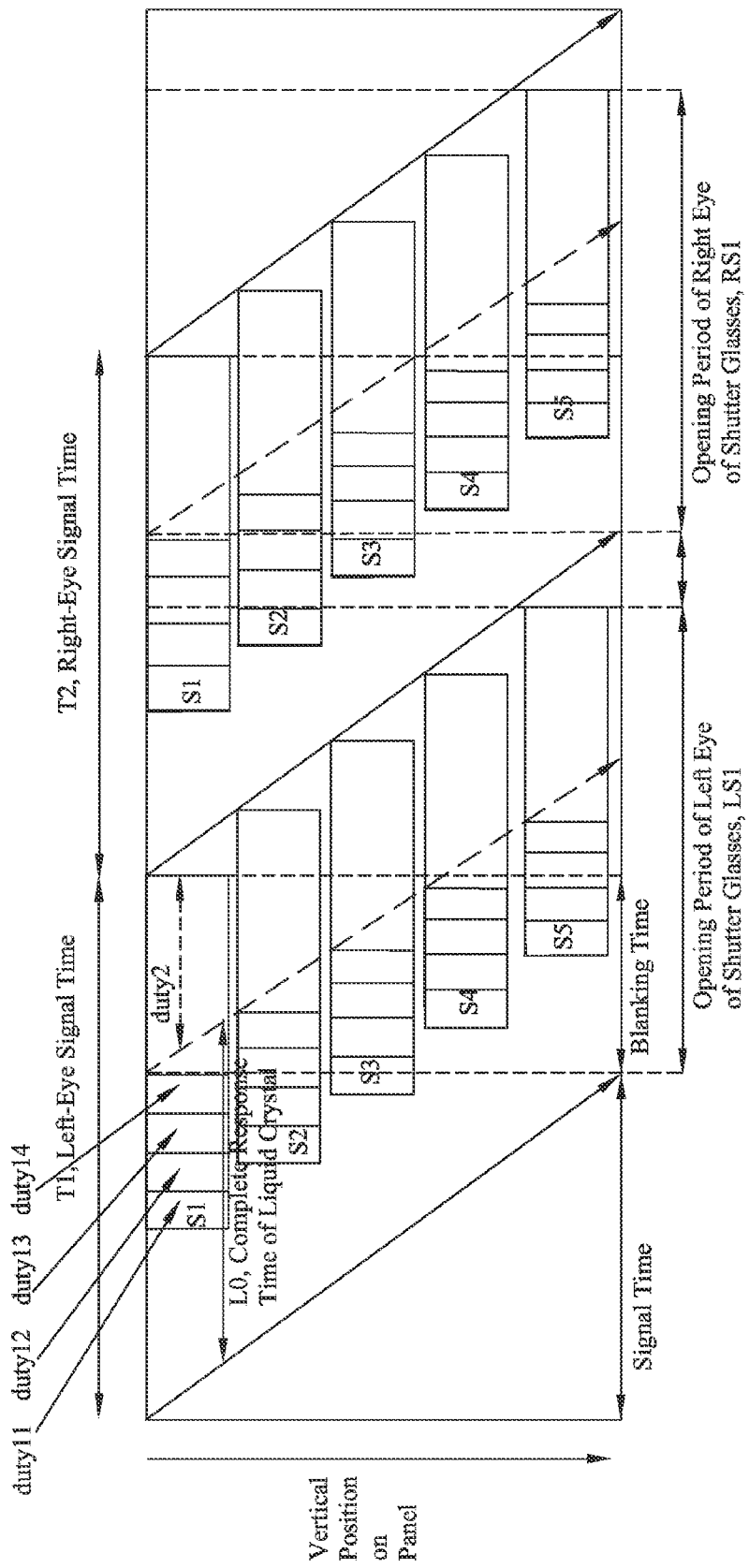
FIG. 3 is a timing chart of an operation method of shutter glasses based 3D display device according to the present invention according to a second preferred embodiment of the present invention.

Referring to FIG. 3, a timing chart of an operation method of shutter glasses based 3D display device according to a second preferred embodiment of the present invention is shown. The second embodiment is an improvement of the first embodiment. Since the variation of transient luminance in duty 1 period is uncertain, for the average transmittance of duty1 period shown in embodiment 1 can be done by being further divided into sub-duty time (duty1, duty12, duty13, duty14), each being given a estimation of different transient transmittance to thereby improve the preciseness of luminance in duty1 period.

The duty1 period is divided into n sub-periods duty11, duty12, duty13, . . . , duty1n. In each sub-period, the maximum signal grey level of the liquid crystal corresponding to each block of the back light unit is corrected to Max and $T'_{max,m,n}$ indicates the average transient transmittance of the liquid crystal corresponding to the mth block of the back light unit under signal grey level Max for the nth sub-period, where Max indicates the maximum signal grey of the liquid crystal panel and n is a natural number greater than 2;

The mth block of the back light unit is adjusted to set the luminance thereof in the nth sub-period of duty1 period to be $B'_{Max,m,n}$ and the luminance in the duty2 period be $B_{Max,m}$ according to the following formula: target luminance=$T'_{Max,m,n}\times B'_{Max,m,n}=T_{Max}\times B_{Max,m}$.

Thus, specifically, according to block S1, the transient transmittance in the duty1 period can be transient transmittance $T'_{255}$ of duty11, transient transmittance $T''_{255}$ of duty12, transient transmittance $T'''_{255}$ of duty13, and transient transmittance $T''''_{255}$ of duty14.

$$L_N=T_N\times B_N=L_N=T'_{255}\times B'_{255}=T''_{255}\times B''_{255}=T'''_{255}\times B'''_{255}=T''''_{255}\times B''''_{255}.$$

In summary, the operation method of shutter glasses based 3D display device according to the present invention alleviates the after image phenomenon due to crosstalk between left and right eyes without shortening the duty time of each block of the BLU, and can make compensation for magnified signal of LED current of each time interval for each block by calculation of the transient transmittance of the compensation signal of each interval for each block to thereby reduce overdriving of backlight LED current, reduce the needed number of LEDs for backlighting, and also achieve the purposes of saving power.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An operation method of shutter glasses based 3D (3-Dimensional) display devices, which alternatively supplies left-eye and right-eye frame signals to a liquid crystal panel to drive the liquid crystal panel to respectively form left-eye and right-eye images, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal, and according to the time of complete response of the liquid crystal as being driven by the signal of the current frame, the duty time of each of the blocks is divided into duty1, a duty time that precedes completion of response of liquid crystal, and duty2, a duty time that succeeds the completion of response of liquid crystal, luminance of each of the block in duty1 period and duty2 period being respectively adjusted so that each of the blocks has a luminance of liquid crystal corresponding thereof that is equal to a target luminance for both duty1 period and duty2 period;

wherein for each pixel located in the liquid crystal corresponding to each of the blocks of the back light unit:

in the duty1 period, the maximum grey level signal of the liquid crystal corresponding to each block of the back light unit is corrected to Max, and $T'_{max,m}$ indicates the average transient transmittance of the liquid crystal corresponding to the mth block of the back light unit under signal grey level being Max, where Max indicates the maximum signal grey of the liquid crystal panel;

in the duty2 period, the transmittance of each pixel is individually changed to $T_{m,pixel} = T_{m,pixel,0} \times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to the mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame; and the mth block of the back light unit is adjusted to set the luminance thereof in the duty1 period to be $B'_{Max,m}$ and the luminance in the duty2 period be $B_{Max,m}$ according to the following formula: target luminance = $T'_{Max,m} \times B'_{Max,m} = T_{Max} \times B_{Max,m}$.

2. The operation method of shutter glasses based 3D display devices as claimed in claim 1, wherein for each pixel located in the liquid crystal corresponding to each of the blocks of the back light unit:

in the duty1 period, the duty1 period is divided into n sub-periods duty11 to duty1n, and in each sub-period, the maximum signal grey level of the liquid crystal corresponding to each block of the back light unit is corrected to Max and $T'_{Max,m,n}$ indicates the average transient transmittance of the liquid crystal corresponding to the mth block of the back light unit under signal grey level Max for the nth sub-period, where Max indicates the maximum signal grey of the liquid crystal panel and n is a natural number greater than 2;

in the duty2 period, the transmittance of each pixel is individually changed to $T_{m,pixel} = T_{m,pixel,0} \times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to the mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame; and the mth block of the back light unit is adjusted to set the luminance thereof in the nth sub-period of the duty1 period to be $B'_{Max,m,n}$ and the luminance in the duty2 period be $B_{Max,m}$ according to the following formula:

target luminance = $T'_{Max,m,n} \times B'_{Max,m,n} = T_{Max} \times B_{Max,m}$.

3. The operation method of shutter glasses based 3D display devices as claimed in claim 2, wherein the target luminance = transmittance of the maximum steady grey level signal of the liquid crystal corresponding to each of the blocks × the duty time of backlight of the block × backlight luminance of compensated driving current of the block, wherein the target luminance of liquid crystal corresponding to each of the blocks is the maximum 2D luminance of the liquid crystal corresponding to the block or the maximum 3D luminance of the liquid crystal corresponding to the block.

4. The operation method of shutter glasses based 3D display devices as claimed in claim 2, wherein calculating average transient transmittance is performed as follows: a grey-to-grey response curve of liquid crystal being measured; based on number of time intervals to be divided, the response curve being equally divided into time intervals according the number of division; and transmittance of each identical interval of time being calculated from the response curve.

* * * * *